United States Patent [19]

Kubo

[11] Patent Number: 4,949,368
[45] Date of Patent: Aug. 14, 1990

[54] BEARING ASSEMBLY AND ROTATING ANODE X-RAY TUBE DEVICE EMPLOYING BEARING ASSEMBLY

[75] Inventor: Masahiro Kubo, Kanagawa, Japan

[73] Assignee: Kabushiki Kaisha Toshiba, Kanagawa, Japan

[21] Appl. No.: 348,540

[22] Filed: May 8, 1989

[30] Foreign Application Priority Data

Jul. 15, 1988 [JP] Japan ............................ 63-176712

[51] Int. Cl.$^5$ ............................................. H01J 35/10
[52] U.S. Cl. .................................... 378/132; 378/133; 384/507; 384/508
[58] Field of Search ............... 378/132, 129, 143, 133, 378/121, 125; 384/912, 536, 490, 45, 13, 523, 507, 508, 510, 511

[56] References Cited

U.S. PATENT DOCUMENTS

| | | | |
|---|---|---|---|
| 2,216,888 | 10/1940 | Machlett .............................. | 378/132 |
| 2,813,210 | 11/1957 | Zunick et al. ........................ | 378/132 |
| 3,634,870 | 1/1972 | Kessler ................................ | 313/60 |
| 3,635,283 | 1/1987 | Starek et al. ........................ | 378/132 |
| 3,720,853 | 3/1973 | Atlee et al. .......................... | 313/60 |
| 4,097,759 | 6/1978 | Furbee et al. ....................... | 378/133 |
| 4,272,696 | 6/1981 | Stroble et al. ....................... | 313/60 |
| 4,393,511 | 7/1983 | Jens .................................... | 378/132 |

*Primary Examiner*—Janice A. Howell
*Assistant Examiner*—Kim-Kwok Chu
*Attorney, Agent, or Firm*—Finnegan, Henderson, Farabow, Garrett and Dunner

[57] ABSTRACT

A rotating anode type X-ray tube device comprises a bearing assembly for supporting a rotating member. The bearing assembly includes a first member having a cylindrical configuration, and a second member having at least a portion concentrically disposed in said first member and at least one separation-type ball bearing is interposed between the first and the second member for supporting a relative rotating motion therebetween. The separation-type ball bearing has an inner race and an outer race with one of the inner and the outer race being open at an axial end thereof. A through-hole serves as a ball-introduction passageway when assembling the separation-type ball bearing from a position near the open end of the one race to a radially outer surface of the first member. According to the above construction, even when an interfering member is mounted on the first or second member, balls of the separation-type ball bearing can be placed through the through-hole with no obstacle after completely assembling the rotating member. It is unnecessary to disassemble the rotating member when removing it from the X-ray tube device. It is also unnecessary to disassemble the rotating member when correcting the unbalanced state of the rotating member.

23 Claims, 10 Drawing Sheets

BEARING ASSEMBLY AND ROTATING ANODE X-RAY TUBE DEVICE EMPLOYING BEARING ASSEMBLY

BACKGROUND OF THE INVENTION

1. Field of the Invention

The present invention relates to a bearing assembly and a rotating anode X-ray tube device employing the bearing assembly.

2. Description of the Prior Art

Ball bearings are well-known for supporting relatively rotating members. Among the variety of devices which utilize ball bearings, the rotating members often become imbalanced because of the structure of the particular device. Sometimes the imbalance is not easily corrected. For instance, as illustrated in FIG. 13, a cylinder 2 is fixed to the outer periphery of a rotary member or shaft 1. A supporting cylinder 3 is partially fitted into the rotary shaft 1. Ball bearings 4 and 5 are interposed between the rotary shaft 1 and the supporting cylinder 3. In this device, rotary shaft 1 is separable from cylinder 2 at a location indicated by the line A—A in the Figure. After providing ball bearings 4 and 5 between rotary shaft 1 and supporting cylinder 3, the location indicated by the line A—A is joined to cylinder 2. In this arrangement, the installation of ball bearings 4 and 5 requires the use of sleeves and nuts. These components, however, tend to cause an imbalanced state in the rotary shaft.

A balancing test is generally performed on an imbalanced rotary member, and in view of the results of the test, it is generally necessary to modify the rotary member or its components in order to correct the imbalance. In the above-described construction, the rotary member has to be temporarily separated at the location shown by the line A—A to correct the imbalance. However, the rotary member is often also imbalanced because of its separation from the cylinder and its subsequent rejoining. Consequently, it is quite difficult and time-consuming to correct an imbalanced condition in a rotary member.

A rotating anode X-ray tube device is a typical device which may be subject to the foregoing imbalance problem. The rotating anode X-ray tube device generally comprises a vacuum envelope, a cathode provided in the vacuum envelope and a rotating anode also provided in the vacuum envelope. The rotating anode is spaced from the cathode. A support member for supporting the rotating anode is provided at one end thereof, and is coaxial with the rotating anode. A cylindrical rotor is supported on the end of the support member opposite the end on which the rotating anode is supported. The rotor comprises a driving motor which cooperates with a stator disposed concentrically with the motor and outwardly of the vacuum envelope, a cylindrical first member disposed inwardly of the rotor, the first member having one end connected to the support member and another end connected to a stationary member, a second member concentric to the first member, and a plurality of ball bearings interposed between the first and second members for providing a relative rotation therebetween. Generally the rotor of the driving motor is positioned close to the stator. Also the rotor is generally cylindrically shaped and light in weight.

In such a rotating anode X-ray tube device, the rotating anode increases in temperature during operation. Therefore, it is necessary to position the ball bearings as far away from the rotating anode as possible to avoid the effects of the increased operating temperatures. Consequently, the ball bearings must be disposed in an internal space of the cylindrical rotor, with the result that the arrangement of the components provided in the vacuum envelope resembles the construction depicted in FIG. 13. With this arrangement, correcting the imbalance of the rotary member is difficult and time consuming.

A typical rotating anode X-ray tube device generally uses ball bearings having balls where an outer surface of each ball is coated with a lubricating film layer of silver, lead or molybdenum disulfide, all of which exhibit a lubricating effect in a vacuum. In the above-described rotating anode X-ray tube device, it is necessary to assemble the rotary member after installing the bearing device. Hence the test of the imbalance of the rotary member and the correction of the imbalance have to be performed in an assembly having ball bearings where the balls are coated with the lubricating film layer. In the above-described rotating anode X-ray tube device, the rotating anode is generally operated at a rotational frequency of approximately 10,000 cycles per minute. The test for imbalance has to be carried out at the same rotational frequency. If this test is done in the above-described assembly, the lubricating film layer on the surface of the ball is damaged or peeled off, resulting in either a reduced life or a decline in reliability of the X-ray tube device, or both.

Thus, a conventional bearing device employing a ball bearing exhibits the following disadvantages. When a conventional bearing device is employed in a rotating anode X-ray tube device, it is difficult and time-consuming to correct the imbalanced condition of the rotary member. Furthermore, particularly where ball bearings are used in a rotating anode X-ray tube device, the lubricating film layer on the surface of each ball is damaged or peeled off when the balancing test and the correction of the imbalance of the rotary member are performed.

Accordingly, it is an object of this invention to provide a rotating anode X-ray tube device capable of performing a balancing test on a rotary member and the correction of an imbalance in the rotary member.

Another object of the present invention is to provide a rotating anode X-ray tube device capable of preventing damage to the bearing which is caused when the balancing test and the correction of the imbalance of the rotary member performed.

SUMMARY OF THE INVENTION

To achieve the foregoing objects, and in accordance with the purposes of the invention as embodied and broadly described herein, there is provided a bearing assembly comprising a first member having a cylindrical configuration, a second member partially disposed in the first member and concentric therewith, at least one separation-type ball bearing interposed between the first and the second member for supporting a relative rotating motion therebetween, the ball bearing having an inner race and an outer race, at least one of the inner race and the outer race being open at an axial end thereof, and a through-hole serving as a ball introduction passageway when assembling the separation type ball bearing, the through-hole leading from a position near the end of the ball bearing to the radially outer surface of the first member.

In accordance with the purpose of the invention as embodied and broadly described herein, there is further provided a rotating anode-type X-ray tube device comprising a vacuum envelope for maintaining an internal vacuum, a cathode disposed in the vacuum envelope, a rotating anode disposed in the vacuum envelope facing the cathode and being spaced therefrom, a support member for supporting the rotating anode, a cylindrical rotor cooperating with a stator, the stator being disposed axially remote from said vacuum envelope, and a second member partially disposed in the first member and concentric therewith. At least one separation-type ball bearing is interposed between the first and second members for supporting a relative rotating motion therebetween, the bearing having an inner and an outer race, one of the inner and the outer race being open at an axial end thereof, and a through-hole serving as a ball-introduction passageway when assembling the separation-type ball bearing, the through-hole leading from a position near the open end of the bearing to a radially outer surface of the first member.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DESCRIPTION OF THE PREFERRED EMBODIMENTS

Reference will now be made in detail to the present preferred embodiment of the invention as illustrated in the accompanying drawings.

Figure 1:
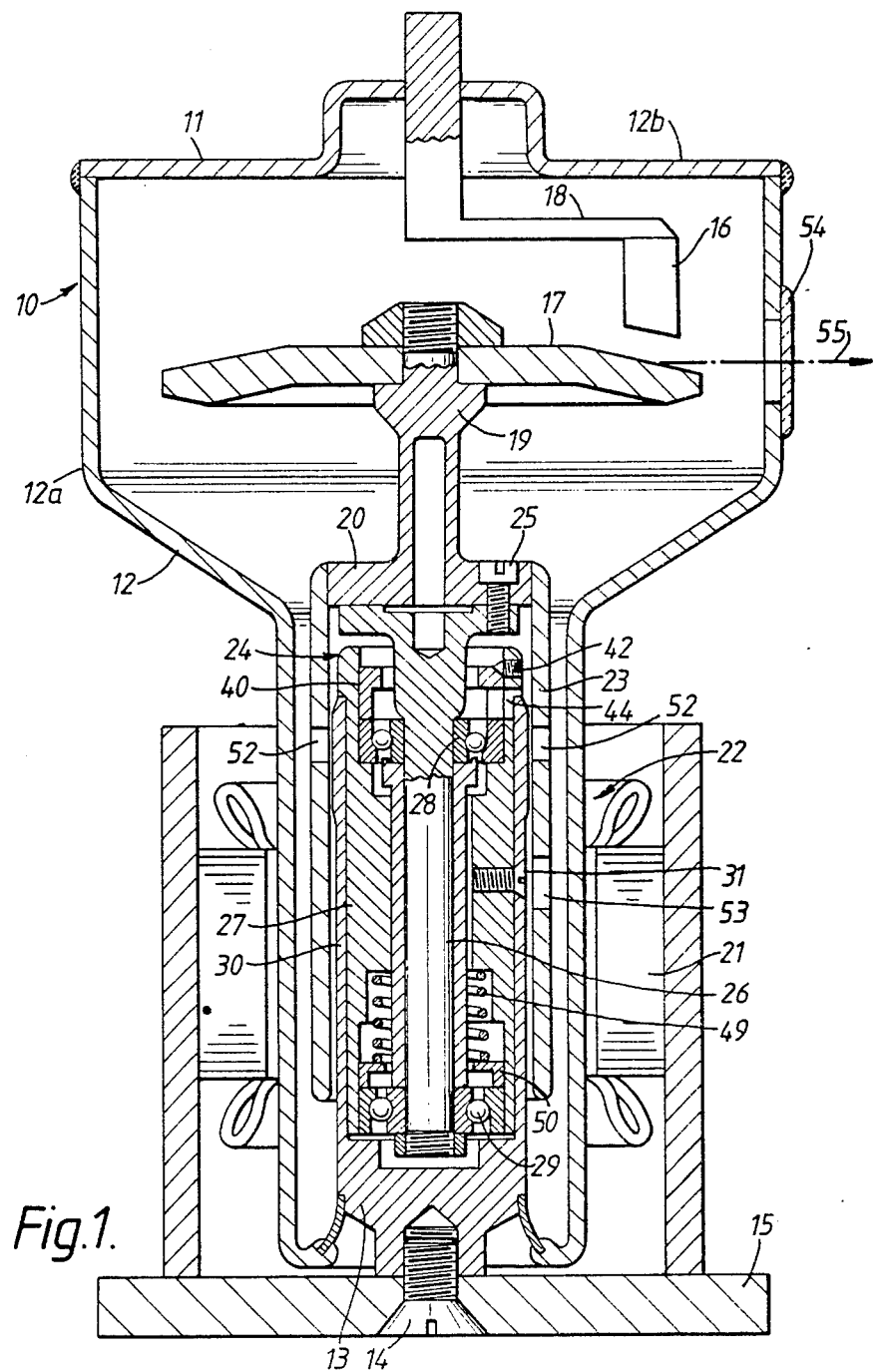
FIG. 1 is a vertical sectional view of a rotating anode X-ray tube device according to a first embodiment of the present invention.

In accordance with the present invention, there is provided a rotating anode X-ray tube device. The device is shown generally at 10 in FIG. 1. X-ray tube device 10 includes a vacuum envelope 11. Vacuum envelope 11 comprises an envelope body 12 formed of an insulating material and having an opening facing downward in FIG. 1. A metallic sealing member 13 is provided on the lower end, as shown in FIG. 1, of envelope body 12 to airtightly seal the opening of envelope body 12. Sealing member 13 is fastened to a metallic base 15 with a screw 14.

Disposed at an upper portion of FIG. 1 in a space formed in vacuum envelope 11 are a cathode 16 with a filament and a rotating anode 17 having a disc-like configuration so that the cathode 16 faces the periphery of rotating anode 17. Cathode 16 is fixed to one end of a cathode support 18 which is formed of a metallic material. The other end of cathode support 18 airtightly penetrates a wall of envelope body 12 and leads to the atmosphere. A driving hysteresis motor 22 cooperates with a stator 21 which are both positioned outwardly of envelope body 12.

Rotating anode 17 is fastened at its center to the upper end portion, as shown in FIG. 1, of a metallic support member 19 with a screw. A lower end portion, as shown in FIG. 1, of support member 19 is integrally formed with an end cap 20. End cap 20 is coaxial with rotating anode 17. A cylindrical rotor 23 is coaxial with end cap 20 and is fixed thereto by shrink-fitting or press-fitting. End cap 20 is fixed by a screw to a bearing assembly 24. Bearing assembly 24 includes a metallic shaft or second member 26 which is coaxial with the rotating anode 17. A metallic cylindrical, first member 27 is disposed concentrically between shaft 26 and rotor 23, and is free to rotate with respect to these two elements. A cylindrical unit 30 extends from sealing member 13. Cylindrical member 27 is attached to cylindrical unit 30 with a screw 31.

Two separation-type ball bearings 28 and 29 are interposed between cylindrical member 27 and shaft 26 and are axially spaced from each other. Bearings 28 and 29 are formed with inner races 33 and 35, respectively, and outer races 38 and 45, respectively.

Ball 43 is disposed between inner race 33 and outer race 38 and ball 46 is disposed between inner race 35 and outer race 45. Ball 46 is coated with a lubricating film layer. Since a separation-type bearing is used, it is unnecessary to unite the inner and outer races and the balls.

Figure 2:
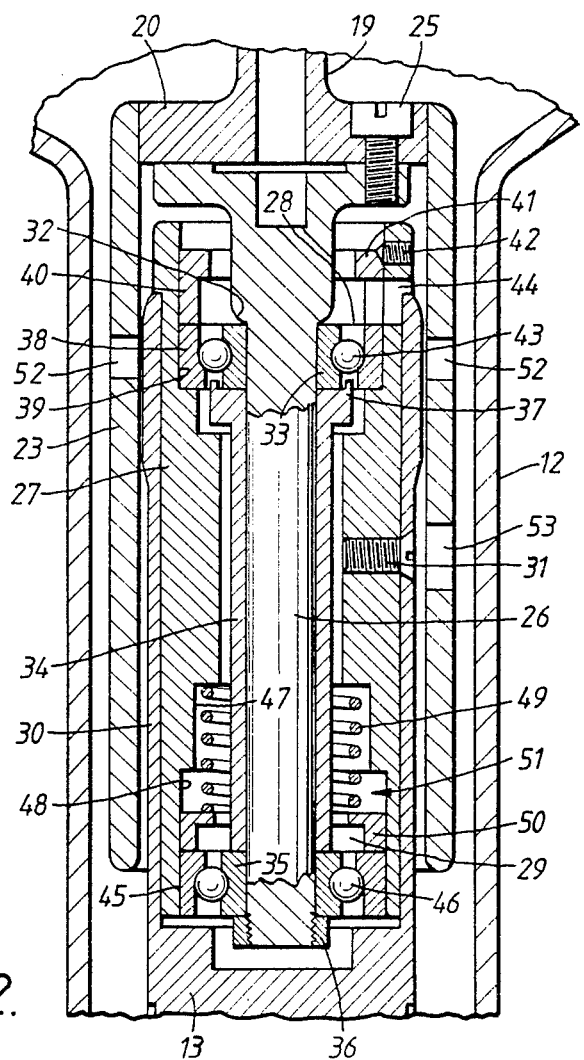
FIG. 2 is an enlarged view illustrating a section of the rotating anode X-ray tube device of FIG. 1.
Figure 3:
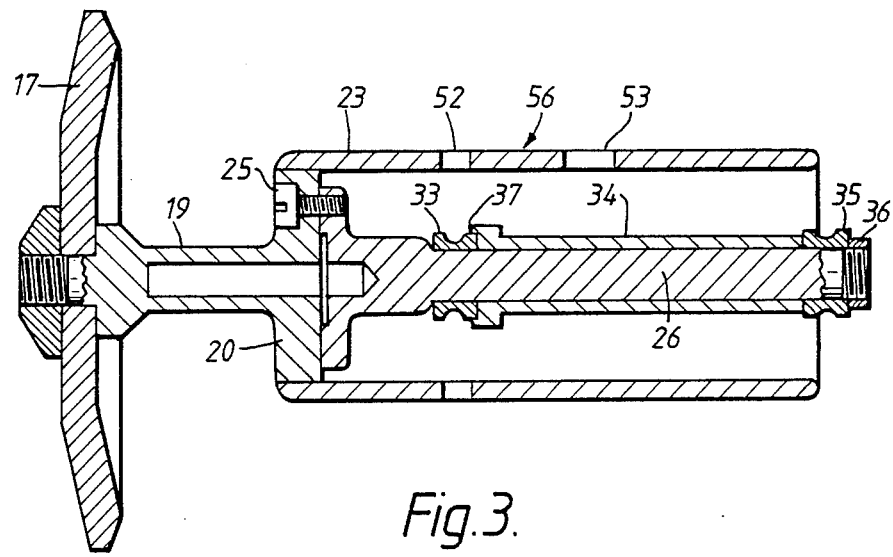
FIG. 3-7 are views of sections of the rotary member of the X-ray tube device of FIG. 1 during assembly thereof.

The arrangement of the separation-type ball bearings is as follows. As shown in FIG. 3, inner races 33 and 35 have ball-receiving grooves. As illustrated in FIG. 2, a stepped portion 32 forms a boundary for inner race 33. Inner race 33 of ball bearing 28 is fixed to shaft 26 and is bounded by stepped portion 32. A sleeve 34 is fitted on shaft 26. Inner race 35 of ball bearing 29 is also fixed to shaft 26. A nut 36 is mounted on the bottom of shaft 26 as shown in FIG. 2. An end of sleeve 34 positioned near inner race 33 is formed with a protruding peripheral wall 37 which extends parallel to a radially outer peripheral surface of the inner race 33 for a short distance. Alternatively, protruding peripheral wall 37 may be formed integrally with inner race 33. Protruding peripheral wall 37 prevents dispersion of balls 43, 46 of the ball bearings when they are installed, which will be discussed hereinafter.

Outer races 38 and 45 are mounted while balls 43 and 46 are held in the ball receiving grooves of inner races 33 and 35, respectively. Outer race 38 of separation-type ball bearing 28 is formed with a ball receiving surface for receiving ball 43. Similarly, outer race 45 of separation-type ball bearing 29 is formed with a ball-receiving surface for receiving ball 46. Cylindrical member 27 is formed with a through hole 44 which has a diameter slightly larger than that of ball 43 to permit ball 43 to pass therethrough and into the ball-receiving surface of outer race 38 and the ball receiving groove of inner race 33. Similarly, outer race 45 of separation-type ball bearing 29 is formed with a ball-receiving surface for receiving ball 46.

As shown in FIG. 2, two stepped large diameter portions 47 and 48 are provided on the inner surface of the cylindrical member 27. Portions 47 and 48 are disposed near sealing member 13. A coil spring 49 having one end abutting a shoulder of large diameter portion 47 is installed. A slide ring 50 is then mounted slidably in the axial direction so as to push against spring 49. Subsequently, race 45 is mounted slidably in the axial direction so that it is biased against the central portion of cylindrical member 27.

The bias of spring 49 acts against a large diameter portion 39 formed on the inner surface of cylindrical member 27. The outer race 38 abuts the stepped portion formed at the boundary on large diameter portion 39. A portion of cylindrical member 27 closer to the end cap 20 than outer race 38 is mounted with a space ring 40 which has the same inside diameter as that of the opening of the outer race 38. Outer race 38 and space ring 40 may be formed integrally. Through-hole 44 which penetrates space ring 40 and cylindrical member 27 leads from the inner surface of space ring 40 to the outer surface of cylindrical member 27 so as to extend to the outside in the radial direction thereof. A small diameter ring 41 having an inside diameter substantially equal to the minimum inside diameter of the outer race 38 is formed integrally with an end portion of space ring 40. Cylindrical member 27 is fitted with a screw 42 which exhibits a wedge function to force space ring 40 on outer race 38 through the intermediary action of small diameter ring 41. Space ring 40 and the outer race 38 abut cylindrical member 27 by virtue of the force of screw 42. Because of this force, ball 43 can be held between the outer race 38 and the inner race 33.

The force of spring 49 moves outer races 38 and 45 and consequently balls 43 and 46 against fixed inner races 33 and 35, respectively, to hold ball 46 in place. Coil spring 49 and slide ring 50 constitute a pressurizing mechanism for securely holding the balls 43 and 46 between inner race 33 and outer race 45. At the same time coil spring 49 and slide ring 50 facilitate installation of ball 46 by moving outer race 45.

Through-holes 52, each having almost the same diameter as that of the through-hole 44, are formed in the peripheral wall of rotor 23 180° apart in such a way that through-holes 52 are disposed in radial alignment with the ball receiving surface of inner race 33. Through-hole 52 is formed as a slot extending in the peripheral direction. Holes 53, which permit a screw 31 to be fastened from the outer surface of rotor 23, are formed the peripheral wall of rotor 23 120° apart so as to be disposed in radial alignment with screw 31.

Numeral 54 designates a transmission window for admitting a beam of X-ray 55 emitted from rotating anode 17. In the rotating anode X-ray tube device according to the present invention, a filament is energized while driving motor 22. A predetermined DC voltage is generated between base 15 and cathode support 18, whereby X-ray 55 can be emitted from anode 17.

According to the present invention, rotary members are assembled in vacuum envelope 11. Rotary members include rotating anode 17, support member 19, rotor 23, shaft 26, inner race of separation-type ball bearing 29 and nut 36. A balancing test and correction of imbalance are performed on the thus assembled rotary members in the atmosphere with the aid of the balls and the outer race. Thereafter, the rotary members are incorporated into the device as shown in FIG. 1. In the case of assembly as shown in FIG. 3, the first step is to assemble a rotary member 56. A balancing test is performed on rotary member 56 in the atmosphere by using testing balls, a testing outer race and stator of the motor. The outer races are tested on a testing portion. Test portion includes cylindrical member 27, space ring 40, coil spring 49, slide ring 50 and through-hole 44. The use of such a testing portion eliminates the necessity for actually employing balls 43 and 46 during testing. In addition, any imbalanced state of rotary member 56 can be corrected without disassembling the rotary member. The reason for this will be understood from the following description.

Figure 4:
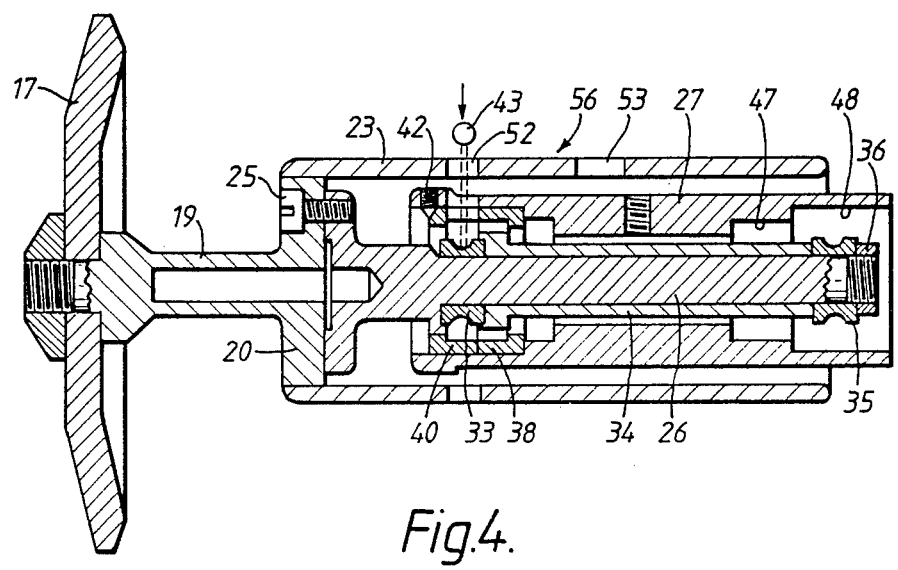
Figure 5:
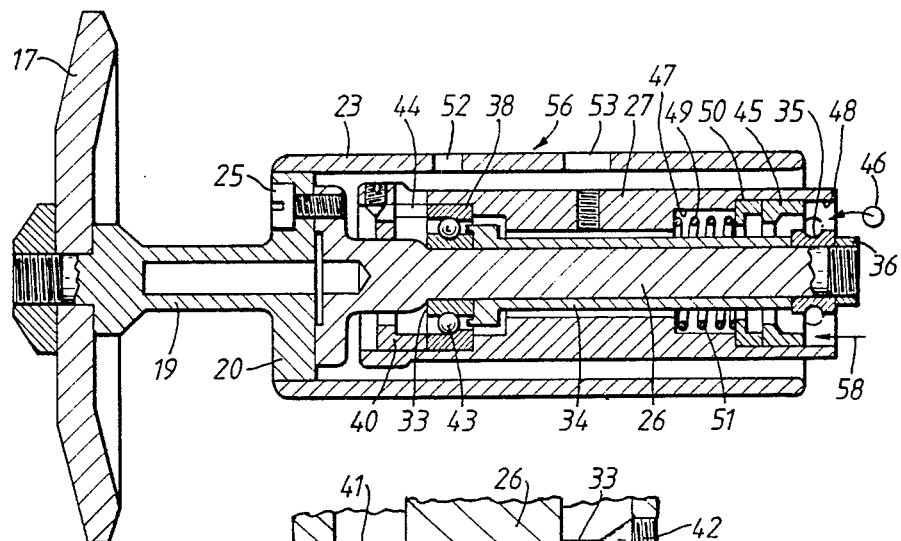
Figure 6:
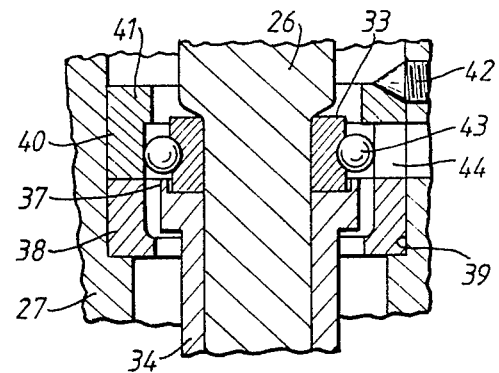

After correcting the imbalanced state of rotary member 56, as shown in FIG. 4, cylindrical member 27 is fitted to shaft 26. At this time, only outer race 38, space ring 40 and screw 42 are mounted on cylindrical member 27. As depicted in FIG. 4, the degree to which cylindrical member 27 is fitted to shaft 26 is adjusted so that the ball receiving groove formed in the outer surface of the inner race 33 is visible from the outer surface of the rotor 23 by through-holes 44 and 52. In this state, balls 43 are dropped into the ball receiving groove formed in inner race 33 one by one as the necessity arises via through-holes 44 and 52. Every time balls 43 are dropped, they are fitted in the ball receiving groove formed in the inner race 33. FIG. 6 shows a bearing assembly where balls 43 have been fitted. Balls 43 are restrained from movement in the axial direction with the help of protruding peripheral wall 37 and small diameter ring 41.

Figure 7:
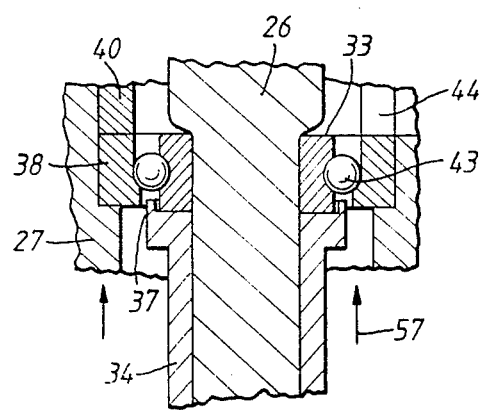

As shown in FIG. 7, cylindrical member 27 is then moved, as indicated by a solid line arrow 57, toward end cap 20, thereby increasing the fit between end cap 20 and cylindrical member 27. As the fit is increased, the ball receiving surface of outer race 38 is brought into contact with ball 43. Outer race 45 is biased towards outer race 38, resisting the force of coil spring 49, in which state the balls 46 are held in the ball-receiving groove of inner race 35. Subsequently, when outer race 45 is released, outer race 45 is returned to its original position by virtue of the force of coil spring 49, with the result that the ball-receiving surface of outer race 45, as shown in FIG. 2, engages ball 46. Rotary member 56 is consequently rotatably supported on cylindrical member 27 through separation-type ball bearings 28 and 29 and the imbalance of the rotary member in this arrangement has been corrected. As a result, rotary member 56 can readily be taken out without disassembling it. When taking out rotary member 56, the above-described procedures may be reversed.

After incorporating the rotary member, through-hole 44 is closed. The assembly of the rotating anode X-ray tube device after incorporating the rotary member is carried out in the following manner. First, cylindrical unit 30 extending from sealing member 13 is fitted to the outer periphery of cylindrical member 27. Cylindrical unit 30 is fixed to cylindrical member 27 with a screw 31 which is screwed in a hole 53 formed in rotor 23. Next, as illustrated in FIG. 1, a cylindrical unit 12a of container body 12 is mounted and airtightly connected to sealing member 13. An upper opening of cylindrical unit 12a is airtightly sealed with an upper cover 12b fitted with cathode support 18 and cathode 16. Then, vacuum envelope 11 is evacuated to a predetermined vacuum and is completely sealed by a sealing unit, not shown. Sealing member 13 is fastened to base 15 with a screw 14, and rotor 23 is attached, thus completing the assembly.

Figure 8:
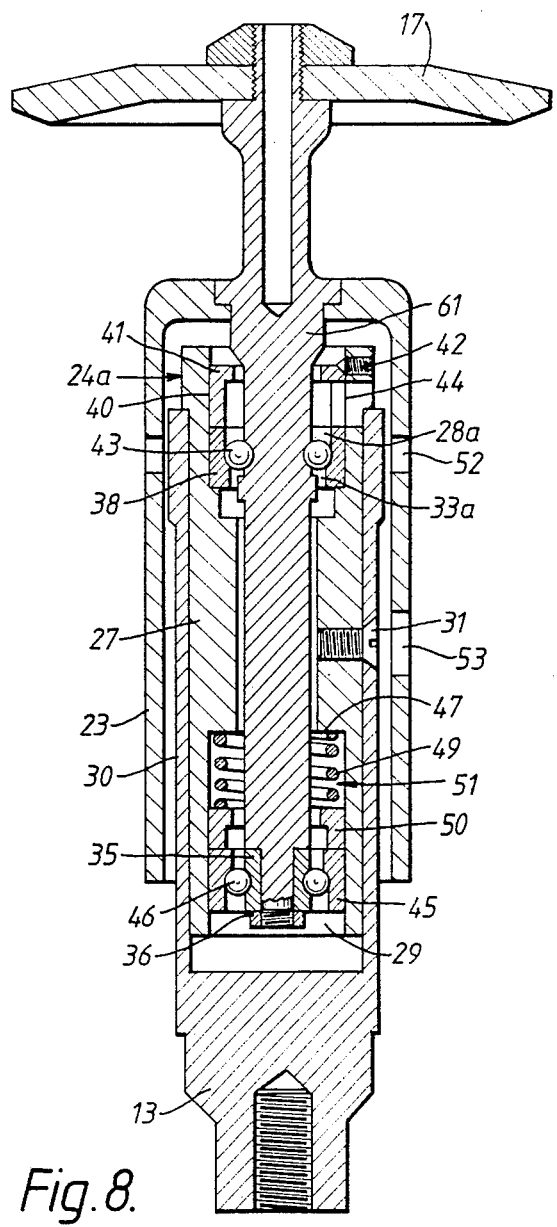
FIG. 8 is a partial vertical sectional view of the rotating anode X-ray tube device according to a second embodiment of the present invention.

FIG. 8 illustrates a major portion of a rotating anode X-ray tube device according to a second embodiment of the present invention. FIG. 8, the like components are marked with the same symbols as those shown in FIGS. 1-7 and hence the overlapping detailed description will be omitted with respect to this Figure.

In the embodiment of FIGS. 1-7, support member 19 and shaft 26 are formed as separate members. In the embodiment of FIG. 8, however, these components are combined to form a support shaft 61. An inner race 33a of a separation type angular ball bearing 28a disposed includes a groove formed in the outer peripheral surface of the support shaft 61 with such a structure, the number of components of the rotary member may be reduced, thereby facilitating the assembly thereof.

Figure 9:
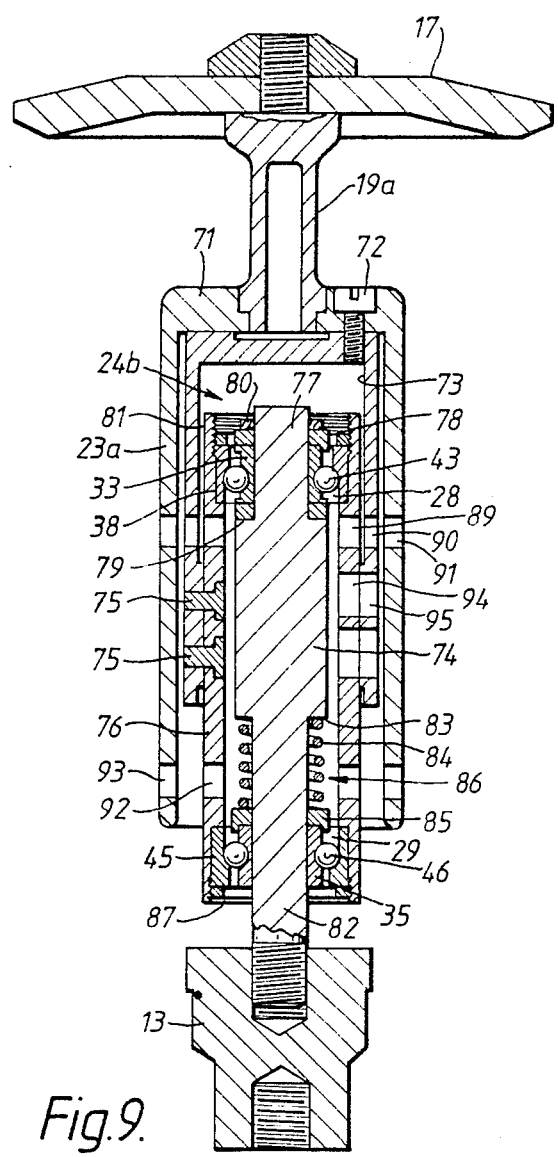
FIG. 9 is a partial vertical sectional view of a rotating anode X-ray tube device according to a third embodiment of the present invention.

Referring next to FIG. 9, there is illustrated a major portion of a rotating anode X-ray tube device according to still another embodiment. In FIG. 9, like components are marked with the same symbols as those shown in FIGS. 1-7, and the overlaping detailed description will therefore be omitted herein.

In this embodiment, an end portion of a rotor 23a, positioned adjacent rotating anode 17, is provided with end cap 71. End cap 71 is press-fitted on a lower end portion, as shown in FIG. 9, of a support member 19a. A metallic auxiliary cylindrical member 73 is fixed to the inner surface of end cap 71 with a screw 72. A fixed shaft 74 is disposed in auxiliary cylindrical member 73 so that part of fixed shaft 74 is concentrically fitted therein. A lower end, illustrated in FIG. 9, of fixed shaft 74 is connected to sealing member 13.

A bearing assembly 24b is provided between fixed shaft 74 and auxiliary cylindrical member 73. Bearing assembly 24b includes a main cylindrical member 76 fixed to the inside of auxiliary cylindrical member 73 with a screw 75. Bearing assembly 24b further includes two axially spaced separation-type ball bearings 28 and 29 interposed between main cylindrical member 76 and fixed shaft 74.

Inner race 33 of separation-type ball bearing 28 is mounted on the outer periphery of a small diameter portion 77 formed at an end of fixed shaft 74 adjacent support member 19a. Both axial ends of inner race 33 are held in place by holding rings 78 and 79, each having a larger diameter than that of inner race 33. Inner race 33 is fastened to fixed shaft 74 with a screw 80. Outer race 38 of separation-type angular ball bearing 28 is provided with a ball-receiving surface. Outer race 38 is formed on the radially outer periphery of main cylindrical member 76. Outer race 38, which is biased upwardly as shown in FIG. 9, is mounted on the upper end of main cylindrical member 76. Cylindrical member 76 is formed with an opening so that the radially inner surface of the opening is aligned with the radially inner surface of outer race 38. Outer race 38 is fastened to main cylindrical member 76 with a screw 81.

Inner race 35 of separation-type angular ball bearing 29 is mounted on the outer periphery of a small diameter portion 82 of fixed shaft 74. Inner race 35 is movable in the axial direction. Interposed between the inner race 35 and a small diameter portion formed on fixed shaft 74 is a pressurizing mechanism 86 including a coil spring 84 and a slide ring 85 having a diameter slightly larger than that of inner race 35. Outer race 45 of bearing 29 is provided with a ball-receiving surface for holding ball 46 in place in bearing 29. Outer race 45, which is biased downwardly as shown in FIG. 9, is mounted on the lower end portion of main cylindrical member 76. The radially inner surface of the opening of cylinder member 76 is aligned with the radially inner surface of outer race 45. Outer race 45 is fastened to main cylindrical member 76 with a screw 87.

A through-hole 89 having a diameter slightly larger than that of ball 43 is formed in a peripheral wall of main cylindrical member 76. Through-holes 90 and 91, each having the same diameter as that of through-hole 89, are coaxially formed in the peripheral walls of auxiliary cylindrical member 73 and rotor 23a, respectively, so as to face through-hole 89. Similarly, a through-hole 92 having a diameter slightly larger than that of ball 46 is formed in the peripheral wall of main cylindrical member 76 near the upper end, as shown in FIG. 9, of outer race 45. A through-hole 93, having a diameter which is the same as that of through-hole 92, is formed coaxially with through-hole 92 in the peripheral wall of rotor 23a as to face through-hole 92. Main cylindrical member 76 and auxiliary cylindrical member 73 are formed with through-holes 94 and 95, respectively, into which a screw 75 is fastened.

With such an arrangement, the rotary member is assembled, and the imbalanced state thereof is corrected, as in the preceding embodiments shown in FIGS. 1-7 and 8. Thereafter, the rotary member can rotatably be mounted on fixed shaft 74. Moreover, the above-described arrangement contributes to an increase in length of a heat transferring passageway between anode 17 and separation type angular ball bearings 28 and 29 because of the presence of auxiliary cylindrical member 73, thereby diminishing thermal influences on ball bearings 28 and 29. Also, the diameter of the rotary member in bearing assembly 24b is enlarged, whereby the rigidity of the rotary member is increased.

The assembling procedures in this embodiment will be hereinafter be described. The procedure begins with a step of fixing outer races 38 and 45 to main cylindrical member 76 with fastening screws 81 and 87 prior to inserting main cylindrical member into auxiliary cylindrical member 73. Then, main cylindrical member is fixed to auxiliary cylindrical member 73 with a screw 75 inserted through through-holes 94 and 95. Auxiliary cylindrical member 73 is fixed to rotor 23a, which has already been fixed to the support member 19a by screw 72. Then, rotary anode 17 is fixed to support member 19a. After the rotary member has been assembled, a balancing test is performed on the rotary member by employing testing balls and an inner race, and the imbalance is then corrected. Fixed shaft 74, mounted by inner race 33, holding rings 78 and 79 and fastening screw 80, is inserted into main cylindrical member 76. The ball receiving groove formed in inner race 33 is aligned with through-holes 89, 90 and 91. In this position, the required number of balls 43 are placed through through-holes 89 to 91 into ball-receiving groove of inner race 33. Fixed shaft 74 is further inserted in cylindrical member 76 to such an extent that the ball receiving surface of outer race 38 is brought into contact with balls 43. In this position, coil spring 84, slide ring 85 and inner race 35 are fitted to a small diameter portion of fixed shaft 74. Inner race 35 is biased, resisting the force of coil spring 84, to such an extent that the ball-receiving groove of inner race 35 is brought into alignment with through-holes 92 and 93. With this arrangement, the necessary number of balls 46 are passed through through-holes 93 and 92 into the ball receiving groove of inner race 35. Then, when inner race 35 is released, the inner race reverts to its original position by virtue of the force of coil spring 84, with the result that ball 46 is held by inner race 35 and outer race 45. After incorporating the rotary member, fixed shaft 74 is fixed to sealing member 13, and thereafter the rotary member is assembled by the same procedures as those used in the embodiment of FIG. 1. In the case of dismounting the rotary member from fixed shaft 74, the reverse procedures to those described above may be performed.

Figure 10:
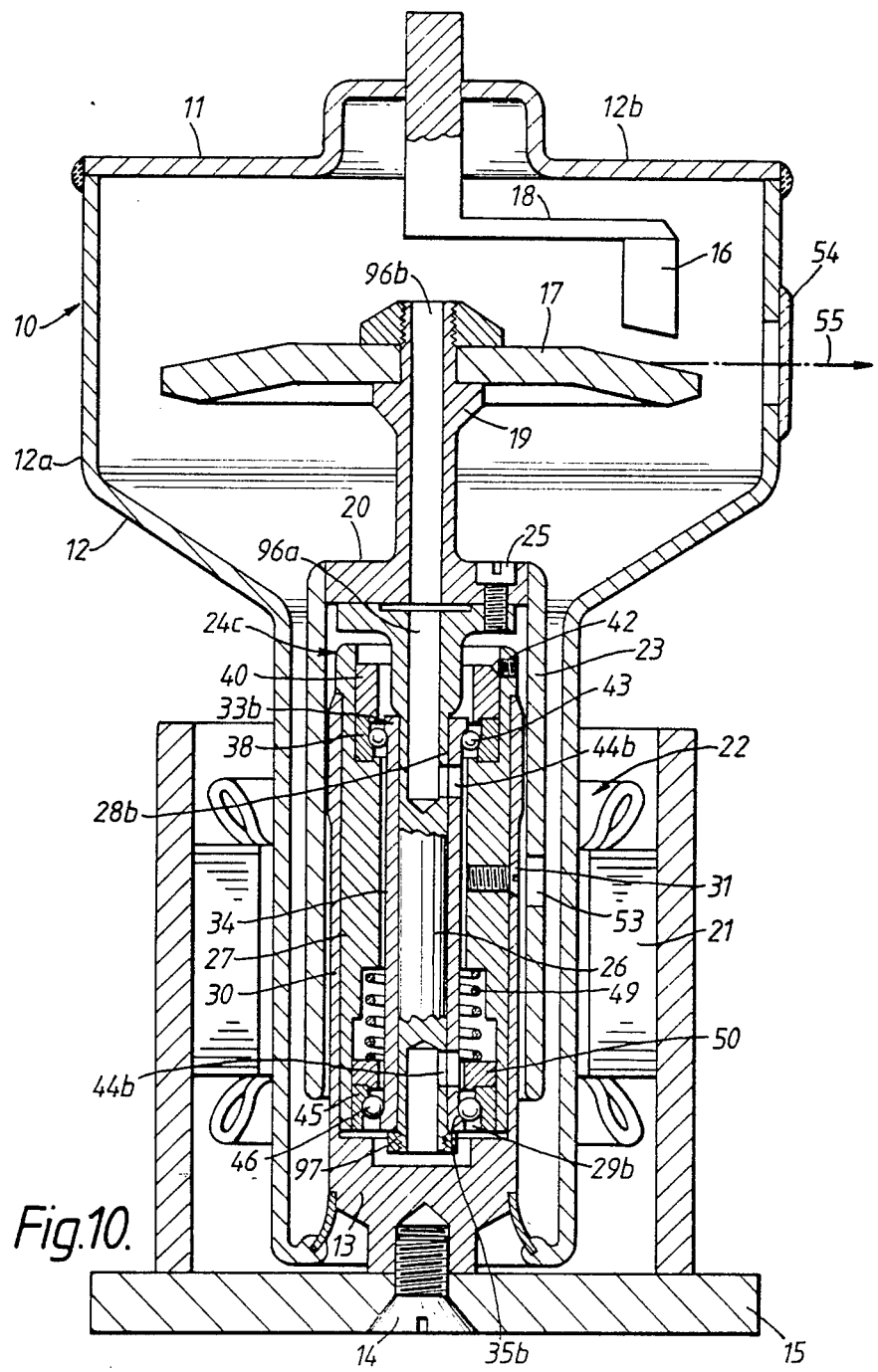
FIG. 10 is a vertical sectional view of a rotating anode X-ray tube device according to a fourth embodiment of the present invention.
Figure 11:
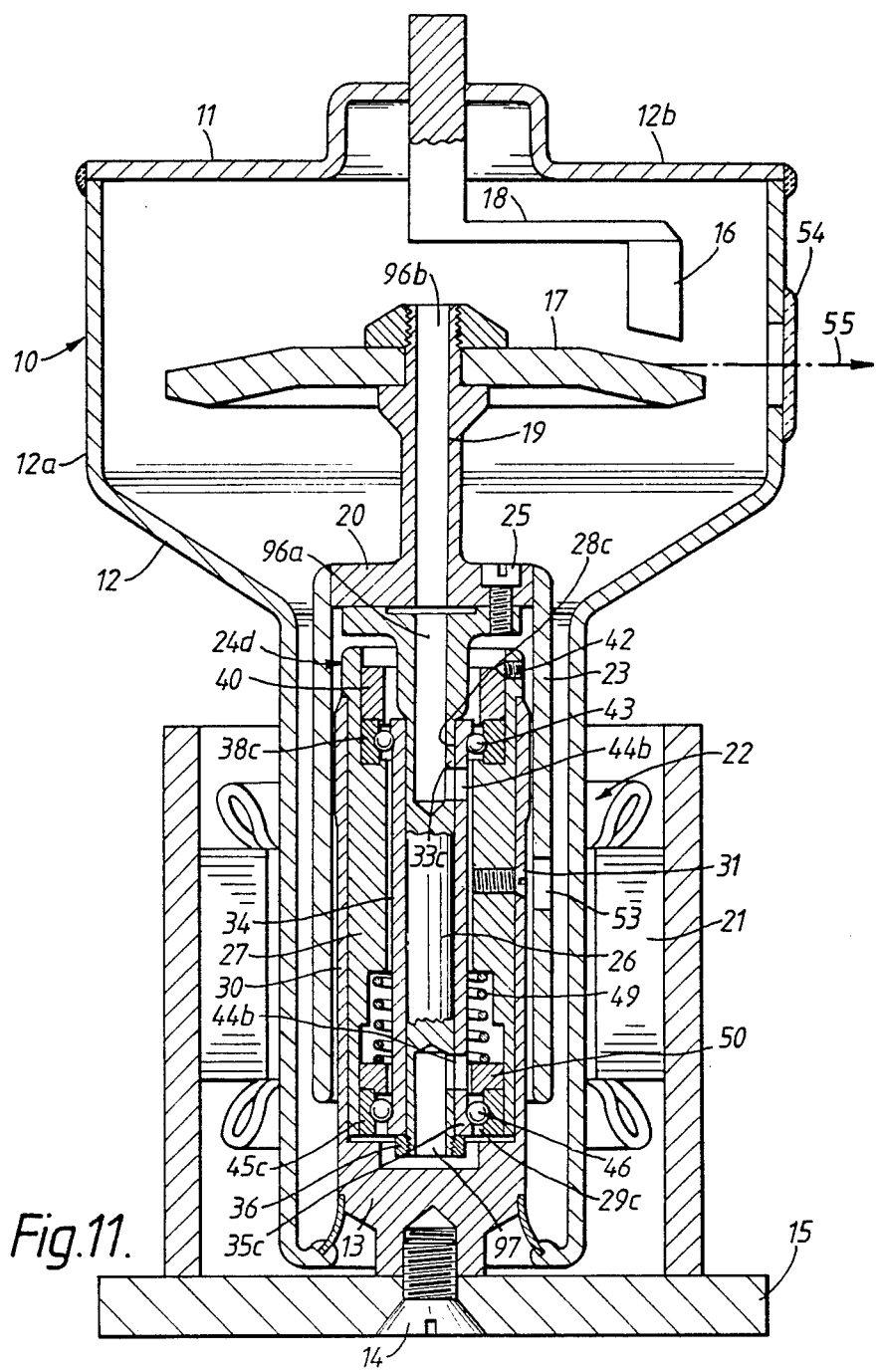
FIG. 11 is a vertical sectional view of a rotating anode X-ray tube device according to another embodiment of the present invention.
Figure 12:
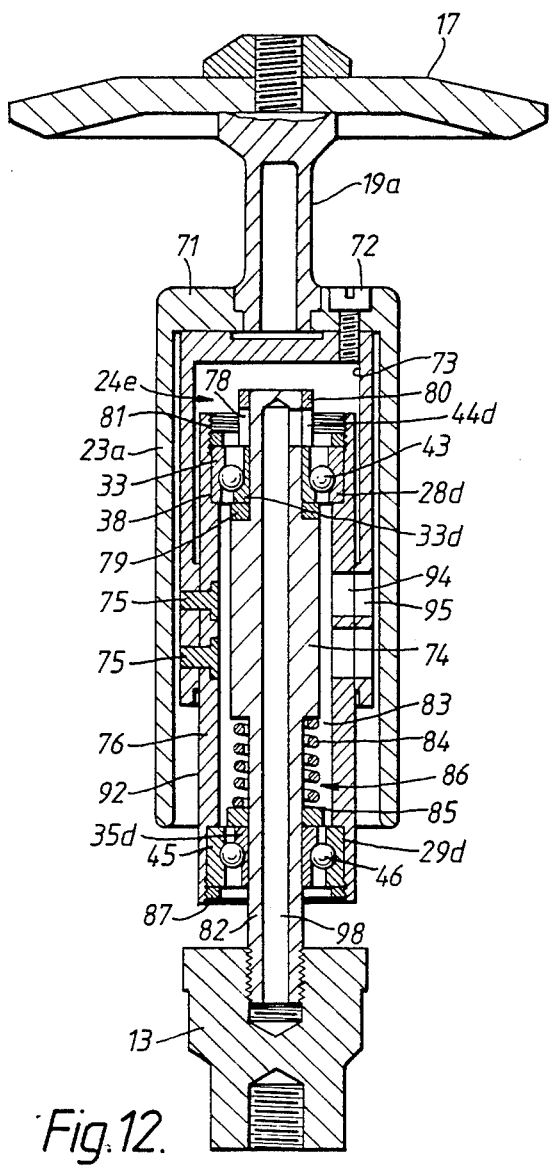
FIG. 12 is a partial vertical sectional view of a rotating anode X-ray tube device according to still another embodiment of the presention invention.
Figure 13:
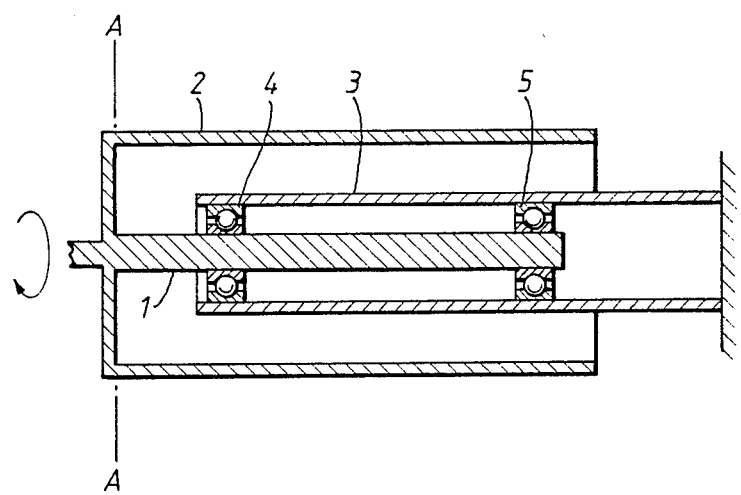
FIG. 13 is a schematic view of a rotary support member of a conventional rotating anode X-ray tube device.

FIGS. 10 to 12 are views of the major portions of rotating anode X-ray tube device, according to a fourth, fifth and sixth embodiment, respectively, of the present invention. In these Figures, like components are marked with the same symbols as those shown in FIGS. 1 to 9. The overlapping detailed description is therefore omitted.

Explanation will now be focused on the characteristic arrangement of FIGS. 10-12. In all of these figures, fixed shaft 74 or shaft 24 is formed with a through-hole serving as a ball passageway extending in the axial and then in the radial direction, and further leading to the outer radial surface of shaft 26.

In the embodiment shown in FIG. 10, separation type ball bearings 28b and 29b are installed, in close proximity to inner races 33b and 35b. Through-holes 44b are formed and extend in the radial direction through a sleeve 34 and to the outer peripheral surface of shaft 26. Shaft 26 is formed with through-holes 96a and 97 which extend from the upper and lower ends of shaft 26 in the axial direction and then in the radial direction. Through holes 96a and 97 communicate with through-holes 44b. Support member 19 includes a through-hole 96b which extends in the axial direction and communicates with through-hole 96a. Each of through-holes 44b, 96a, 96b and 97 has a diameter slightly larger than the diameter of balls 43 and 46. For this reason, as in the embodiment described above, the required number of balls 43 and 46 may be fit in separation-type ball bearings 28b and 29b, with through-holes 44b, 96a, 96b and 97 each serving as a ball introduction passageway. By virtue of bearing assembly 24c, it is possible to incorporate or remove the rotary member, whose imbalanced state has been corrected, without disassembling the rotary member.

FIG. 11 shows a modification of FIG. 10, and illustrates still another embodiment according to the present invention. In this example, separation-type ball bearings 28c and 29c include outer races 38c and 45c which are form with ball receiving grooves. Inner races 33c and 35c, which are biased in opposite directions, are formed to permit passage of the balls 43 and 46. Bearing assembly 24d of this embodiment exhibits the same operation as those in the previous embodiment.

FIG. 12 shows a variation of FIG. 9, and illustrates still another embodiment according to the present invention. In this example, separation type ball bearings 28d and 29d include inner races 33d and 35d which are biased in opposite directions. Formed in close proximity to inner race 33d is a through-hole 44d extending in the radial direction from the outer surface of a holding ring 78 to the outer surface of fixed shaft 74. Fixed shaft 74 is formed with a through-hole 98 which extends from the lower end of the shaft in the axial direction and then in the radial direction. Through-hole 98 communicates with through-hole 44d. Through-holes 44d and 98 each have a slightly greater diameter than that of ball 43. As in the preceding embodiment, it is therefore possible to fit the necessary number of balls 43 in separation type ball bearing 28d, with through-holes 44d and 98 serving as ball introduction passageways. Note that the balls can be fitted from a space outside a ball bearing 29d. By virtue of bearing device 24e, the rotary member can be incorporated or removed without disassembling the rotary member, the imbalanced state of which has already been corrected. The same results as those described in the previous embodiment can be obtained.

In the embodiment of FIG. 12, the directions in which the outer race 38 and 45 are biased opposite to those shown in FIG. 1. Also, the pressurizing direction of pressurizing mechanism 51 in FIG. 12 is the opposite of that shown in the FIG. 1, i.e., in FIG. 12 a force may be imparted for biasing the outer races 38 and 45 towards the center of cylindrical member 27. Furthermore, if the clearance of each individual component is accurately set, the pressurizing mechanism may be altogether omitted.

The embodiments described above exemplify a case where two separation-type ball bearings are employed. However, modifications of the bearing arrangement may be made without departing from the scope of the general inventive concept. For instance, one ball bearing more distant from the rotating anode than the other may be replaced by an ordinary ball bearing. Also, the above-mentioned characteristic functions of bearing assemblies 24 and 24a-24e, respectively, are not confined to the rotating anode X-ray tube device but may support a wide variety of rotary bodies.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the general inventive concept as defined by the appended claims and their equivalents.

What is claimed is:

1. A bearing assembly comprising:
    a first member having a cylindrical configuration;
    a second member partially disposed in said first member and concentric therewith;
    at least one ball bearing interposed between said first and said second member for supporting a relative rotating motion therebetween, said ball bearing having an inner race and an outer race, one of said inner and said outer race being open at an axial end thereof; and
    a through-hole serving as a ball introduction passageway when assembling said ball bearing, said through-hole leading from a position near the open end of the one race to a radially outer surface of at least said first or said second member.

2. A bearing assembly according to claim 1, including two ball bearings disposed symmetrically about a line drawn perpendicular to said second member.

3. A bearing assembly according to claim 1, wherein said one race is an outer race, and said through-hole extends from a position near said open end of said outer race to the outside of the bearing assembly in the radial direction and then leads to a radially outer surface of said first member.

4. A bearing assembly according to claim 1, wherein said one race is an inner race, and said through-hole extends from a position near said open end of said inner race radially inwardly and then in the axial direction to an axially outer surface of said second member.

5. A bearing assembly according to claim 1, further including a ball introduced between said inner and outer race, said outer race being slidable in the axial direction, thereby producing an axial force on the ball.

6. A bearing assembly according to claim 5, further including a loading mechanism for imparting a loading force to said outer race, said loading force acting in a direction so as to increase said axial force.

7. A bearing assembly according to claim 1, wherein said inner race of said ball bearing and a portion of said second member are integrally formed.

8. A bearing assembly according to claim 1, wherein said through-hole is closed after said ball bearing is assembled.

9. A bearing assembly according to claim 5, further including means for preventing dispersion of said ball in the axial direction when said ball is introduced between said inner race and said outer race.

10. A rotating anode-type X-ray tube device comprising:
   a vacuum envelope for maintaining an internal vacuum;
   a cathode disposed in said vacuum envelope;
   a rotating anode also disposed in said vacuum envelope facing said cathode and being spaced therefrom;
   a support member for supporting said rotating anode;
   a cylindrical rotor cooperating with a stator, said stator being disposed radially remote from vacuum envelope;
   a cylindrical first member disposed radially inwardly of said rotor;
   a second member having at least a portion concentrically disposed in said first member;
   at least one ball bearing interposed between said first and second members for supporting a relative rotating motion therebetween, said ball bearing having an inner race and an outer race, one of said inner and said outer race being open at an axial end thereof; and
   a through-hole serving as a ball introduction passageway when assembling said ball bearing, said through-hole leading from a position near the open end of the one race to a radially outer surface of at least said first or said second member.

11. A rotating anode X-ray tube device according to claim 10, wherein said first member is fixed and has one axial end connected to a stationary member and said second member rotates and has one axial end connected to said support member.

12. A rotating anode X-ray tube device according to claim 10, wherein said first member has one axial end connected to said support member and said second member has one axial end fixed to said stationary member.

13. A rotating anode X-ray tube device according to claim 10, including two ball bearings disposed symmetrically about to a line drawn perpendicular to said second member.

14. The rotating anode X-ray tube device according to claim 10, wherein said one race is an outer race, and said through-hole extends from a position near said open end of said outer race to the outside of the bearing assembly in the radial direction and then leads to an outer surface of said first member.

15. A rotating anode X-ray tube device according to claim 10, wherein said one race is an inner race, and said through-hole extends from a position near said open end of said inner race radially inwardly and then in the axial direction to an axially outer surface of said second member.

16. A rotating anode X-ray tube device according to claim 10, further including a ball introduced between said inner and said outer race, said outer race being slidable in the axial direction, thereby producing an axial force on the ball.

17. A bearing assembly according to claim 16, further including a loading mechanism for imparting a loading force to said outer race, said loading force acting in a direction so as to increase said axial force.

18. A rotating anode X-ray tube device according to claim 10, wherein said through-hole is closed off after said ball bearing is assembled.

19. A rotating anode X-ray tube device according to claim 16, further comprising means for preventing dispersion of said ball in an axial direction when said ball is introduced between said inner race and said outer race.

20. A rotating anode X-ray tube device according to claim 10, wherein said at least one ball bearing is installed near said rotating anode.

21. A rotating anode X-ray tube device according to claim 10, wherein said support member and said second member are integrally formed.

22. A rotating anode X-ray tube device according to claim 10, wherein said rotor and said first member are integrally formed.

23. A rotating anode X-ray tube device according to claim 16, wherein said rotor is formed with a through-hole for permitting said ball to be introduced.

* * * * *